United States Patent
Tuerkoglu et al.

(10) Patent No.: US 10,370,620 B2
(45) Date of Patent: Aug. 6, 2019

(54) METHOD FOR PRODUCING POLYASPARTIC ACID UNDER REFLUX COOLING

(71) Applicant: BASF SE, Ludwigshafen am Rhein (DE)

(72) Inventors: Gazi Tuerkoglu, Mannheim (DE); Juergen Detering, Limburgerhof (DE); Dietrich Fehringer, Dielheim (DE); Christian Benz, Worms (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/757,469

(22) PCT Filed: Sep. 5, 2016

(86) PCT No.: PCT/EP2016/070793
§ 371 (c)(1),
(2) Date: Mar. 5, 2018

(87) PCT Pub. No.: WO2017/042112
PCT Pub. Date: Mar. 16, 2017

(65) Prior Publication Data
US 2018/0251709 A1    Sep. 6, 2018

(30) Foreign Application Priority Data
Sep. 8, 2015  (EP) .................... 15184264

(51) Int. Cl.
| C08G 69/04 | (2006.01) |
| C11D 3/37 | (2006.01) |
| C08G 69/10 | (2006.01) |
| C08G 73/10 | (2006.01) |

(52) U.S. Cl.
CPC ............ *C11D 3/3719* (2013.01); *C08G 69/04* (2013.01); *C08G 69/10* (2013.01); *C08G 73/1092* (2013.01)

(58) Field of Classification Search
None
See application file for complete search history.

(56) References Cited

U.S. PATENT DOCUMENTS

| 5,039,447 A | 8/1991 | Reuben |
| 5,142,062 A | 8/1992 | Knebel et al. |
| 5,221,733 A * | 6/1993 | Koskan ............... C08G 69/10 528/328 |
| 5,292,447 A | 3/1994 | Venturello et al. |
| 5,294,362 A | 3/1994 | Venturello et al. |
| 5,422,028 A | 6/1995 | Oakes et al. |
| 5,457,176 A * | 10/1995 | Adler .................. C08G 69/10 510/230 |
| 5,552,517 A | 9/1996 | Martin |
| 5,830,985 A * | 11/1998 | Kroner ................. C02F 5/12 528/328 |

FOREIGN PATENT DOCUMENTS

| EP | 0013836 A1 | 8/1980 |
| EP | 0747417 A1 | 12/1996 |
| EP | 0851023 A2 | 7/1998 |
| WO | 9013533 A1 | 11/1990 |
| WO | 9507331 A1 | 3/1995 |
| WO | 9904313 A1 | 1/1999 |
| WO | 9906524 A1 | 2/1999 |
| WO | 2006016035 A1 | 2/2006 |
| WO | 2009019225 A2 | 2/2009 |
| WO | 2015036325 A1 | 3/2015 |
| WO | 2015036344 A1 | 3/2015 |

OTHER PUBLICATIONS

Extended European Search Report for EP Patent Application No. 15184264.8, dated Jan. 29, 2016, 3 pages.
International Search Report for International Application No. PCT/EP2016/070793, dated Dec. 19, 2016, 3 pages.

* cited by examiner

*Primary Examiner* — Christopher M Rodd
(74) *Attorney, Agent, or Firm* — Armstrong Teasdale LLP

(57) ABSTRACT

Provided herein is a method for producing polyaspartic acid under reflux cooling. Further provided herein are compositions including polyaspartic acid obtainable through the method. Also provided herein is a use of polyaspartic acids obtainable through the method in dishwashing agents, detergents, and cleaning agents.

10 Claims, No Drawings

METHOD FOR PRODUCING POLYASPARTIC ACID UNDER REFLUX COOLING

CROSS-REFERENCE TO RELATED APPLICATIONS

This application is the national stage entry of PCT/EP2016/070793, filed on Sep. 5, 2016, which claims the benefit of priority to European Patent Application No. 15184264.8, filed Sep. 8, 2015, which is incorporated by reference in its entirety herein.

TECHNICAL FIELD

The present invention relates to a method for producing polyaspartic acid under reflux cooling, to compositions comprising polyaspartic acid obtainable in such a manner, and also to the use of polyaspartic acids obtainable in such a manner in dishwashing agents, detergents and cleaning agents.

BACKGROUND

The preparation of polyaspartic acid and salts thereof by acid-catalyzed thermal polycondensation of aspartic acid to polyaspartimide and subsequent alkaline hydrolysis of the polyaspartimide is known in principle. The acidic catalysts used are, for example, mineral acids such as phosphoric acid, phosphorous acid, sulfuric acid and sulfurous acid. It is also possible to use organic acids such as methanesulfonic acid or amidosulfonic acid. Phosphoric acid has proven to be particularly suitable as a moderately strong and non-oxidative acid.

Methanesulfonic acid (MSA) is also a suitable catalyst due to its non-oxidative effect.

Preferably, acids such as phosphoric acid serve not only as catalyst but also as solvent. The advantage of a well-controlled polycondensation, when phosphoric acid is catalyst and solvent at the same time, is set against the disadvantage of a necessary product purification. The acid has to be removed by washing and, for reasons of cost, should be laboriously recovered. The alternative would be the use of only small amounts of catalyst. If, however, only small amounts of the acidic catalyst (1 to 25 mol %, based on the amount of aspartic acid used) are used, this results during the condensation in highly viscous to very hard condensation phases which tend to become caked, which in stirring apparatuses or kneaders can no longer be stirred or kneaded. The consequence is that either the condensation has to be stopped or at least interrupted in order to break up again and to comminute baked solid polycondensate. Only then can the polycondensation be continued. For instance, U.S. Pat. No. 5,457,176 A describes the thermal polycondensation of aspartic acid using catalytic amounts of phosphoric acid or methanesulfonic acid. In both examples, the polycondensation is interrupted, the solid intermediate laboriously isolated and comminuted and the comminuted intermediate is fed back to the reaction vessel to complete the condensation. A similar process is described in DE 4023463 A1, where phosphoric acid is used as catalyst in the condensation of aspartic acid and the resulting reaction product has to be mechanically comminuted in a second stage.

DESCRIPTION

This technical object has been achieved by the present invention as described herein and defined in the claims.

The present invention relates to a method for producing polyaspartic acid comprising the following steps:
(a) contacting a mixture of:
  (i) aspartic acid,
  (ii) 1 to 25 mol %, preferably 2 to 20 mol %, preferably 3 to 15 mol %, preferably 3 to 10 mol %, particularly preferably 3 to 8 mol % of an acidic catalyst, and
  (iii) optionally water
  in a reactor;
(b) heating the mixture according to (a) under reflux cooling without distillative removal of water at a reaction temperature of 100 to 220° C., preferably 120 to 200° C., preferably 140 to 200° C., preferably 150 to 200° C., particularly preferably 160 to 180° C. up to a degree of conversion of the aspartic acid of at least 1%, preferably at least 3%, preferably at least 5%, preferably at least 7%, preferably to an extent of up to 15%, particularly preferably to an extent of up to 10%;
(c) polycondensing the reaction mixture according to (b) with simultaneous distillative removal of water at 170 to 250° C., particularly preferably 200 to 230° C.;
(d) hydrolyzing the polycondensates according to (c) with addition of a base; and
(e) optionally acidifying the salts of polyaspartic acid obtained in (d).

For general understanding of the present invention, it is again clarified, as is readily apparent to those skilled in the art, that condensation as described herein is carried out by supplying thermal energy (heating). In overall perspective of the invention described here, for example, it is clear that a condensation takes place (a precondensate is formed) during step (b) of the present invention and that, conversely, the polycondensation also takes place with heating according to step (c) of the present invention.

The optional step (e) of acidification of the polyaspartic acid salt in the method according to the invention serves to obtain the polyaspartic acid in acid form and can be carried out in a manner known to those skilled in the art and as is shown here by way of example. In the case that only the salt of polyaspartic acid is desired, as intermediate stage for example, step (e) in the context of the present invention can be omitted. If, in the context of the present invention, polyaspartic acid is in question, this also comprises accordingly its corresponding salts which are obtainable or are obtained according to step (d) of the preparation process of the invention and which are recognized by those skilled in the art. Potential acids in this context are, for example, mineral acids or acidic ion exchangers. Here, mineral acid may be sulfuric acid or hydrochloric acid for example. However, any other acid is also possible, which is apparent to those skilled in the art as being suitable for the acidification of the salt of the polyaspartic acid to obtain the corresponding acid form. The acid form of the polyaspartic acid may also be obtained by treatment with an acidic ion exchanger such as Amberlite IR 120 (hydrogen form), for example, by allowing the aqueous Na salt solution (or solution of another appropriate salt) of the polyaspartic acid to flow through a column packed with the acidic ion exchanger, for example. This applies analogously to all methods according to the invention for producing polyaspartic acid, as already provided and described herein.

If the polyaspartic acids or salts thereof are desired as light as possible or even colorless, the salts of polyaspartic acid obtained after step (d) may be treated with bleaches such as hypochlorite, chlorine, chlorine dioxide, hydrogen peroxide, peroxy acids, ozone or perborates. Optionally, the color brightening can also be achieved by treating the polycondensates obtained according to step (c) with the aforementioned bleaches. It is additionally also possible to carry out step (d), i.e. hydrolysis of the polycondensates according to (c) with addition of a base, in the presence of the aforementioned bleaches. A particularly preferred bleach is hydrogen peroxide. The exact amount of bleach to be used depends on the desired degree of decoloration. The color brightening is preferably carried out using 0.1-20% by weight, more preferably 0.5-10% by weight of bleach, based on the amount of L-aspartic acid used in the synthesis of polyaspartic acid.

As has been found, surprisingly, in the context of the present invention, the occurrence of a viscous, hard, and barely stirrable or kneadable condensation intermediate phase can be avoided by initially precondensing aspartic acid thermally, after addition of an acidic catalyst, up to a degree of conversion of the aspartic acid of at least 1%, preferably at least 3%, preferably at least 5%, preferably at least 7%, preferably to an extent of up to 10%, under reflux cooling without distillative removal of water (cf. step (b) of the invention). A precondensate is formed comprising in large part still unreacted aspartic acid and water. The precondensate is then further condensed with distillative removal of water until the desired polycondensate is present (cf. step (c) of the present invention). It has been found in this case, in the context of the present invention, that the reflux cooling carried out in accordance with the invention according to step (b) over a longer period after 180 minutes has established a maximum degree of conversion of the aspartic acid of about 10%. This maximum degree of conversion of the aspartic acid, at which point in accordance with the teaching of the invention the reflux phase (b) is terminated and water is distilled off (step (c)), could not be increased alone by extending the duration of reflux cooling of up to 180 minutes, although it should not be ruled out that the degree of conversion of the aspartic acid achieved according to step (b) of the method according to the invention cannot in principle also be above 10%, for example 15%. In particular, a maximum degree of conversion of the aspartic acid according to step (b) of the method according to the invention should not be understood in such a manner to mean that the advantages of the present invention could not also be achieved at higher degrees of conversion. It is conceivable that during step (b) of the present invention, an even higher degree of conversion of the aspartic acid can be achieved by way of example by an even longer duration of step (b). A maximum degree of conversion of the aspartic acid may also be advisable from an economic point of view in order to avoid long periods of reflux cooling according to step (b) of the current invention for example, during which the degree of conversion only increases relatively slowly. For instance, the maximum degree of conversion n of the aspartic acid according to step (b) of the method according to the invention may also be, by way of example, 15%, preferably 10%, wherein the reflux cooling according to step (b) may continue, by way of example, for 20 min, 90 min, 120 min, 150 min, 180 min or longer, as also shown here in the examples. During the polycondensation with distillation in step (c) of the method according to the invention, the degree of conversion of the aspartic acid then increases in a relatively short period and may already be 50 or 60% 1 hour after the start of step (c), as also described here and shown in the examples. Without being bound to a theory, it is assumed that the reaction in the reflux phase does not progress due to particular oligomer formation and the driving force for further conversion of the aspartic acid is the distillation of water.

In the context of the present invention, more critical than the duration of the reflux cooling according to step (b) of the method described herein is therefore the degree of conversion of the aspartic acid achieved during this reflux cooling, at which point the polycondensation with distillative removal of water according to step (c) begins. The minimum degree of conversion of the aspartic acid, at which point step (c) is initiated, is 1% in the context of the present invention. The minimum degree of conversion may also be higher however, for example 3%, 5% or 7%. The maximum degree of conversion of the aspartic acid during the reflux cooling is generally not above 10% to 15%, which cannot be further increased by merely extending reflux cooling as described here. The maximum degree of conversion of the aspartic acid achieved according to step (b) of the method according to the invention, and at which point it is further polycondensed in step (c), may therefore be 10% in one embodiment by way of example or 15% in another embodiment by way of example, although even higher degrees of conversion are not generally a hindrance to the feasibility and usefulness of the present invention.

The polyaspartic acids prepared according to the invention are used, for example, in cleaning compositions, detergent compositions and dishwashing compositions, particularly but not exclusively in dishwashing detergents for automatic dishwashing. A further advantage of the polyaspartic acids prepared in accordance with the invention is that they are biodegradable under aerobic conditions in contrast to other polymers which are used in such compositions and which have been prepared by free-radical polymerization of carboxyl-containing monomers.

The aspartic acid used in the preparation processes according to the invention can be both L- and D-aspartic acid and DL-aspartic acid. Preference is given to using L-aspartic acid.

The temperature after addition of the acidic catalyst in step (b) of the method according to the invention is generally 100 to 220° C., preferably 120 to 200° C., preferably 140 to 200° C., preferably 150 to 200° C., and particularly preferably 160 to 180° C. In the context of the present invention, the temperatures refer to the reaction temperatures, unless stated otherwise. The temperature values in this case relate to a pressure of 1 bar, although it is evident to those skilled in the art that, with corresponding increasing or lowering of the pressure, lower or higher temperatures may also be applied. During step (b) of the method according to the invention, the mixture is condensed (heated) under reflux cooling without distillative removal of water. This step is carried out in accordance with the invention up to a degree of conversion of the aspartic acid of at least 1%, preferably 3%, 5% or 7%.

The degree of conversion may be determined here, for example, by quantitative determination of unreacted monomeric aspartic acid. For this purpose, a defined amount of the reaction mixture obtained according to step (b) is extracted with 1N hydrochloric acid, whereby unreacted monomeric aspartic acid is brought into solution by formation of aspartic acid hydrochloride. By means of liquid chromatographic quantitative determination of the aspartic acid content Y [g] of the extract, the degree of conversion C in the context of the present invention can be calculated by $$C=(X-Y)/X$$

where X [g] is the aspartic acid content of the defined amount of the reaction mixture prior to the start of step (b).

Suitable for use as acidic catalysts in step (a) of the method according to the invention are, for example, inorganic acids of phosphorus and sulfur such as phosphoric acid, phosphorous acid, hypophosphorous acid, sulfuric acid or sulfurous acid, organic acids such as methanesulfonic acid, amidosulfonic acid, p-toluenesulfonic acid or isethionic acid, and also hydrogen halides such as hydrochloric acid. The aforementioned acids may also be used for this purpose in the form of their acidic salts. In one embodiment, the acidic catalyst to be used in accordance with the invention is methanesulfonic acid (MSA). In the context of the present invention, methanesulfonic acid may also be used in the form of its salts. Salts of methanesulfonic acid are obtainable, for example, by partial or complete neutralization of methanesulfonic acid with alkali metal hydroxides or alkaline earth metal hydroxides, ammonium hydroxide, primary, secondary or tertiary aliphatic amines or heterocyclic aromatic amines such as pyridine, imidazole or 1-methylimidazole. The secondary or tertiary aliphatic amines may also in this case be in cyclic form, for example, piperidine. The amount of acidic catalyst (e.g. MSA) used in step (a) in the preparation process according to the invention refers to the amount of aspartic acid used in step (a), unless stated otherwise. In accordance with the invention, 1 to 25 mol % of acidic catalyst are used. That is to say that if, for example, 10 mol of aspartic acid are used in the method according to the invention, 0.1 to 2.5 mol of acidic catalyst are used. Preferably 2 to 20 mol %, preferably 3 to 15 mol %, preferably 3 to 10 mol % and particularly preferably 3 to 8 mol % of acidic catalyst are used, based on the amount of aspartic acid used (in mol) in each case.

The acidic catalyst (e.g. methanesulfonic acid) can be added by metered addition, preferably in one portion at the start of step (a) of the method according to the invention. The amounts of catalyst (methanesulfonic acid for example) described here of 1 to 25 mol %, preferably 2 to 20 mol %, preferably 3 to 15 mol %, preferably 3 to 10 mol %, and particularly preferably 3 to 8 mol % are used here during step (a) according to the invention. In this case, it is possible to add this amount of catalyst all at once (at the start, at the end or midway during step (a)), or continuously or stepwise during step (a) in individual doses. In addition, it is also possible to add still further catalysts during the following steps (b) and/or (c) of the method according to the invention, in which a catalyst other than the one used in step (a) may be used.

In step (a) of the method according to the invention, optionally additional water can also be added in order to distribute the acidic catalyst used more uniformly. The additional water can either be used separately from the acidic catalyst or as a mixture with the acidic catalyst (when using the catalyst as an aqueous solution for example).

The temperature in the polycondensation during step (c) of the preparation processes according to the invention is 170 to 250° C., preferably 180 to 250° C., more preferably 200 to 250° C., particularly preferably 200 to 230° C. The temperatures stated in the context of the present invention refer to the respective reaction temperature at 1 bar reaction pressure, unless stated otherwise. As is clearly evident to those skilled in the art, with corresponding increasing or lowering of the pressure, lower or higher temperatures may also be applied. The polycondensation is ideally conducted up to complete conversion of the reaction partners to polycondensates according to step (c) of the preparation processes according to the invention, for example, for a time period of 1 minute up to 50 hours. In the context of the present invention, complete conversion signifies that the residual amount of unreacted aspartic acid is ≤0.5 wt %, based on the amount of aspartic acid used.

The polycondensation (heat treatment) is preferably conducted in accordance with the invention, by way of example under reduced pressure or under an inert gas atmosphere (e.g. $N_2$, argon). Alternatively, the polycondensation can also be effected under elevated pressure or in a gas stream, e.g. carbon dioxide, air, oxygen or steam. Depending on the reaction conditions selected, the reaction times for the condensation are generally between 1 minute and 50 hours.

To carry out the polycondensation, all reactors and apparatuses operable in a continuous or batchwise manner known to those skilled in this field are suitable, such as heating bands, kneaders, mixers, paddle dryers, hard phase dryers, high-viscosity reactors, extruders, rotary tube ovens and other heatable devices, in which the condensation of solids can be carried out with removal of water of reaction. Also suitable, for example, are apparatuses operating continuously or in batchwise manner having one or more shafts for mixing or mixing and self-cleaning. Such apparatuses are supplied, for example, by LIST AG, Arisdorf, Switzerland under the trade name Discotherm® B, ORP (Opposite Rotating Processor) or CRP (Co-Rotating Processor) or from Buss-SMS-Canzler under the trade name Reactotherm®. Convective apparatuses such as fluidized bed reactors, for example, are also suitable for the condensation. Polycondensates having low molecular weight can be produced in pressure-tight sealed vessels as well, in which the water of reaction resulting is removed only partially, if at all. The polycondensation can also be carried out in principle in apparatuses which are heated directly, e.g. by electrical heating, steam, circulating gas, thermal oil or salt baths. The polycondensation can also be carried out in apparatuses in which the required thermal energy is supplied mainly by radiation of a defined frequency (e.g. infra-red, high frequency, microwave).

In the thermal polycondensation of aspartic acid with acidic catalyst (e.g. methanesulfonic acid), the polycondensate generally occurs in the form of water-insoluble polyaspartimides. The small amounts of acidic catalyst used may remain here in the product without producing disadvantages in the applicability. If desired, however, the polycondensates of aspartic acid can be purified of the acidic catalyst, for example, by comminuting the water-insoluble polyaspartimide and extracting with water at temperatures of 10 to 100° C. Here, the acidic catalyst used is washed out. Unconverted aspartic acid can be leached out easily by extracting with 1N hydrochloric acid.

After the polycondensation according to step (c) of the method according to the invention, the resulting polycondensate is hydrolyzed with addition of a base. The base used here according to the invention can in principle be any base suitable to those skilled in the art. Such bases comprise, inter alia, alkali metal and alkaline earth metal bases such as aqueous sodium hydroxide solution, aqueous potassium hydroxide solution, calcium hydroxide or barium hydroxide; carbonates such as sodium carbonate and potassium carbonate; ammonia and primary, secondary or tertiary amines; other bases having primary, secondary or tertiary amino groups. In one embodiment of the present invention, the base used in step (d) of the method according to the invention is selected from the group consisting of aqueous sodium hydroxide solution, aqueous potassium hydroxide solution, calcium hydroxide, barium hydroxide, sodium carbonate, potassium carbonate, ammonia and ammonium hydroxide. In the context of the present invention, preference is given to sodium hydroxide solution or ammonium hydroxide.

The polyaspartic acids (or salts thereof as described above) are preferably obtained from the polycondensates according to step (c) by slurrying the polycondensate in water and hydrolyzing and neutralizing at temperatures preferably in the range of 0° C. to 90° C. with addition of a suitable base described here. The hydrolysis and neutralization preferably take place at pH values of 8 to 10. In the context of the invention, it is also advantageous to couple the condensation and the hydrolysis with each other in apparatus terms, for example by carrying out the hydrolysis in the same vessel/reactor/apparatus as the preceding condensation. Subsequently, the salts of polyaspartic acid thus obtained may be acidifed in order to obtain the corresponding acid form as described herein.

The polyaspartic acids or salts thereof to be used or which are produced/preparable according to the invention, may be used as an aqueous solution or in solid form e.g. in powder form or granulated form. As is known to those skilled in the art, the powder or granulated form may be obtained, for example, by spray-drying, spray granulation, fluidized bed spray granulation, spouted bed granulation, drum drying or freeze-drying of the aqueous solution of the polyaspartic acids or salts thereof.

The polyaspartic acid to be prepared in accordance with the invention may have different weight-average molecular weights, preferably 6000 to 30 000 g/mol. The weight-average molecular weight can be adjusted here as a function of the amount of acidic catalyst used in step (a) of the preparation processes according to the invention and also of the temperature applied during the polycondensation in step (c). In this case, the optimum temperature to obtain polyaspartic acids having weight-average molecular weight from 6000 to 30 000 g/mol is between 200° C. and 230° C. Lower or higher temperatures, even when using greater amounts of catalyst (e.g. >25 mol % methanesulfonic acid), lead to lower weight-average molecular weights and/or lower product yield. At higher temperatures, there is also the risk of an increasing thermal decomposition of the acidic catalyst with negative impacts on yield, degree of conversion and adjustment of molecular weight. The use of excessively large amounts of acidic catalyst generally also has the disadvantage that relevant amounts of acidic catalyst then remain in the product, which in turn can limit the applicability of the product.

The molecular masses Mw specified in the context of the present invention can be calculated, inter alia, with the aid of a calibration curve, which can be generated using narrowly distributed sodium polyacrylate standards from Polymer Standard Service having molecular weights of M=1250 g/mol to M=130 500 g/mol, as is known to those skilled in the art and as is described herein. In addition, Na-acrylate having a molecular weight of M=96 and a PEG standard with M=620, which is synonymous with Na-PAA M=150, can be used, inter alia, for the calibration.

In the methods for preparing polyaspartic acid according to the invention provided and described herein, it is also possible in the context of the invention to introduce additional acids in step (a) in addition to the acidic catalyst (e.g. MSA) mentioned. For example, it is possible to use here additionally a carboxylic acid (monocarboxylic acid or polycarboxylic acid), a hydroxycarboxylic acid and/or an amino acid (except aspartic acid). Such carboxylic acids or hydroxycarboxylic acids are preferably polybasic. In this context, therefore, in the preparation of polyaspartic acid according to the invention in step (a), in addition to the acidic catalyst mentioned and described here, polybasic carboxylic acids and anhydrides thereof may be used, e.g. oxalic acid, adipic acid, fumaric acid, maleic acid, maleic anhydride, itaconic acid, aconitic acid, succinic acid, succinic anhydride, malonic acid, suberic acid, azelaic acid, diglycolic acid, glutaric acid, $C_1$-$C_{26}$ alkylsuccinic acids (e.g. octylsuccinic acid), $C_2$-$C_{26}$ alkenylsuccinic acids (e.g. octenylsuccinic acid), 1,2,3-propanetricarboxylic acid, 1,1,3,3-propanetetracarboxylic acid, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, trimellitic acid or trimellitic anhydride. In addition, it is possible in this context to use polybasic hydroxycarboxylic acids, for example citric acid, isocitric acid, mucic acid, tartaric acid, tartronic acid, or malic acid. Amino acids used in this connection may include, inter alia, aminocarboxylic acids (e.g. glutamic acid, cysteine), basic diaminocarboxylic acids (e.g. lysine, arginine, histidine, aminocaprolactam), uncharged amino acids (e.g. glycine, alanine, valine, leucine, isoleucine, methionine, cysteine, norleucine, caprolactam, asparagine, isoasparagine, glutamine, isoglutamine), aminosulfonic acids (e.g. taurine), hydroxy amino acids (e.g. hydroxyproline, serine, threonine), iminocarboxylic acids (e.g. proline, iminodiacetic acid), or aromatic and heterocyclic amino acids (e.g. anthranilic acid, tryptophan, tyrosine, histidine), but not aspartic acid. Preferred carboxyl-containing compounds (ii) in the context of the preparation of the modified polyaspartic acids to be used in accordance with the invention are butane-1,2,3,4-tetracarboxylic acid, citric acid, glycine, glutamic acid, itaconic acid, succinic acid, taurine, maleic acid and glutaric acid, particularly preferably butane-1,2,3,4-tetracarboxylic acid, citric acid, glycine and glutamic acid.

The polyaspartic acids preparable in accordance with the invention are characterized by, inter alia, their very good scale-inhibiting and dispersing effect, and specifically with respect to both inorganic and organic deposits. In particular, they inhibit deposits of calcium carbonate and magnesium carbonate and calcium phosphates and phosphonates and magnesium phosphates and phosphonates. In addition, they prevent deposits which originate from the soil constituents of a rinse liquor, for example, fat, protein and starch deposits.

The present invention therefore also relates to the use of polyaspartic acids preparable according to the invention as scale inhibitors or dispersants. The polyaspartic acids can be used here both as additive in cleaning agents, dishwashing agents (particularly machine dishwashing agents) or detergents and also as scale inhibitors or dispersants in water-conducting systems as shown and described here.

The present invention also relates to compositions—particularly cleaning compositions, dishwashing compositions and detergent compositions—comprising polyaspartic acids which are preparable or obtainable by the method according to the invention. One embodiment of the present invention relates in particular to dishwashing compositions for machine dishwashing comprising the polyaspartic acids as described here. Such compositions comprise, in addition to the polyaspartic acids of the invention, further constituents such as for example solvents, surfactants or complexing agents. The polyaspartic acids of the invention can be incorporated directly into the formulations (mixtures) in their various administration forms by the methods known to those skilled in the art. Mention should be made here by way of example of solid formulations such as powders, tablets, gel and liquid formulations. The machine dishwashing compositions of the invention, and the other cleaning, dishwashing and detergent compositions, may be provided in liquid, gel or solid form, in monophasic or polyphasic form, as tablets or in the form of other dose units, and in packed or unpacked form. In this context, the polyaspartic acids preparable according to the invention can be used both in multicomponent product systems (separate use of detergent, rinse aid and regenerating salt), and in such dishwashing agents in which the functions of detergent, rinse aid and regenerating salt are combined in one product (e.g. 3-in-1 products, 6-in-1 products, 9-in-1 products, all-in-one products).

The present invention therefore comprises further compositions comprising the polyaspartic acid prepared or preparable in accordance with the method according to the invention. One embodiment in this case takes the form of dishwashing compositions, particularly those which are suitable for machine dishwashing (ADW).

Dishwashing compositions according to the invention comprise, for example
(a) 1-20% by weight, preferably 1-15% by weight, particularly preferably 2-12% by weight of the polyaspartic acid prepared or preparable in accordance with the invention and described here;
(b) 0-50% by weight complexing agents;
(c) 0.1-80% by weight builders and/or co-builders;
(d) 0.1-20% by weight non-ionic surfactants;
(e) 0-30% by weight bleach, bleach activators and bleach catalysts;
(f) 0-8% by weight enzymes; and
(g) 0-50% by weight additives.

Complexing agents (b) which may be used are, for example: nitrilotriacetic acid, ethylenediaminetetraacetic acid, diethylenetriaminepentaacetic acid, hydroxyethylethylenediaminetriacetic acid, methylglycinediacetic acid, glutamic acid diacetic acid, iminodisuccinic acid, hydroxyiminodisuccinic acid, ethylenediaminedisuccinic acid, aspartic acid diacetic acid, and also salts thereof in each case. Preferred complexing agents (b) are methylglycinediacetic acid and glutamic acid diacetic acid and salts thereof. Particularly preferred complexing agents (b) are methylglycinediacetic acid and salts thereof, especially the mono-, di- and trisodium, -potassium, -lithium and -ammonium salts. The salts of methylglycinediacetic acid may be in racemic form, meaning that D- and L-enantiomers are present in an equimolar mixture, or one enantiomer, e.g. the L-enantiomer, may be present in excess. Preference is given to 3 to 50% by weight complexing agents (b) according to the invention.

The builders and/or co-builders (c) used can be, in particular, water-soluble or water-insoluble substances of which the main task consists of binding calcium and magnesium ions. These may be low molecular weight carboxylic acids and also salts thereof such as alkali metal citrates, in particular anhydrous trisodium citrate or trisodium citrate dihydrate, alkali metal succinates, alkali metal malonates, fatty acid sulfonates, oxydisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate and α-hydroxypropionic acid.

A further substance class with cobuilder properties which may be present in the cleaning compositions of the invention is that of the phosphonates. These are in particular hydroxyalkanephosphonates or aminoalkanephosphonates. Among the hydroxyalkanephosphonates, 1-hydroxyethane-1,1-diphosphonate (HEDP) is of particular significance as cobuilder. It is preferably used in the form of sodium salt, the disodium salt giving a neutral reaction and the tetrasodium salt an alkaline reaction (pH 9). Suitable aminoalkanephosphonates are preferably ethylenediaminetetramethylenephosphonate (EDTMP), diethylenetriaminepentamethylenephosphonate (DTPMP) and the higher homologs thereof. They are preferably used in the form of the neutral reacting sodium salts, for example as the hexasodium salt of EDTMP or as heptasodium and octasodium salts of DTPMP. The builder used in this case is from the class of the phosphonates, preferably HEDP. Aminoalkanephosphonates additionally have a pronounced heavy metal binding capacity. Accordingly, it may be preferable to use aminoalkanephosphonates, particularly DTPMP, or mixtures of the phosphonates mentioned, particularly if the compositions also comprise bleach. Silicates may be used, inter alia, as builders. Crystalline sheet silicates having the general formula $NaMSi_xO_{2x+1}yH_2O$ may be present, where M is sodium or hydrogen, x is a number from 1.9 to 22, preferably from 1.9 to 4, particularly preferred values for x being 2, 3 or 4, and y is a number from 0 to 33, preferably 0 to 20. In addition, amorphous sodium silicates having an $SiO_2:Na_2O$ ratio of 1 to 3.5, preferably 1.6 to 3 and in particular 2 to 2.8 may be used.

Furthermore, in the context of the dishwashing composition according to the invention, builders and/or co-builders (c) used may be carbonates and hydrogen carbonates, among which the alkali metal salts, particularly sodium salts, are preferred.

Furthermore, the cobuilders used may be homopolymers and copolymers of acrylic acid or methacrylic acid preferably having a weight-average molar mass of 2000 to 50 000 g/mol. Suitable comonomers are in particular monoethylenically unsaturated dicarboxylic acids such as maleic acid, fumaric acid and itaconic acid and also anhydrides thereof such as maleic anhydride. Also suitable are comonomers containing sulfonic acid groups such as 2-acrylamido-2-methylpropanesulfonic acid, allylsulfonic acid and methanesulfonic acid. Hydrophobic comonomers are also suitable, for example isobutene, diisobutene, styrene, alpha-olefins with 10 or more carbon atoms. Hydrophilic monomers having hydroxyl functions or alkylene oxide groups may also be used as comonomers. Examples include: allyl alcohol and isoprenol and also alkoxylates thereof and methoxypolyethylene glycol (meth)acrylate.

Preferred amounts of builders and/or cobuilders in the context of the dishwashing composition of the invention are 5 to 80 wt %, more preferably 10 to 75 wt %, 15 to 70 wt % or 15 to 65 wt %.

In the context of the dishwashing composition according to the invention, non-ionic surfactants (d) used can be, for example, weakly or low foaming non-ionic surfactants. These may be present in proportions of 0.1 to 20 wt %, preferably 0.1 to 15 wt %, more preferably 0.25 to 10 wt % or 0.5 to 10 wt %. Suitable non-ionic surfactants comprise, inter alia, surfactants of the general formula (I)

$$R^1-O-(CH_2CH_2O)_a-(CHR^2CH_2O)_b-R^3 \qquad (I),$$

in which $R^1$ is a linear or branched alkyl radical having 8 to 22 carbon atoms, $R^2$ and $R^3$ are each independently hydrogen or a linear or branched alkyl radical having 1 to 10 carbon atoms or H, where $R^2$ is preferably methyl, and a and b are each independently 0 to 300. Preferably, a=1 to 100 and b=0 to 30.

Also suitable in the context of the present invention are surfactants of formula (II)

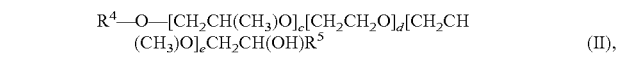

$$R^4-O-[CH_2CH(CH_3)O]_c[CH_2CH_2O]_d[CH_2CH(CH_3)O]_eCH_2CH(OH)R^5 \qquad (II),$$

in which $R^4$ is a linear or branched aliphatic hydrocarbyl radical having 4 to 22 carbon atoms or mixtures thereof, $R^5$ is a linear or branched hydrocarbyl radical having 2 to 26 carbon atoms or refers to mixtures thereof, c and e have values between 0 and 40, and d is a value of at least 15.

Also suitable in the context of the present invention are surfactants of formula (III)

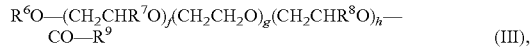

$$R^6O-(CH_2CHR^7O)_f(CH_2CH_2O)_g(CH_2CHR^8O)_h-CO-R^9 \quad (III),$$

in which $R^6$ is a branched or unbranched alkyl radical having 8 to 16 carbon atoms, $R^7$, $R^8$ are each independently H or a branched or unbranched alkyl radical having 1 to 5 carbon atoms, $R^9$ is an unbranched alkyl radical having 5 to 17 carbon atoms, f, h are each independently a number from 1 to 5, and g is a number from 13 to 35.

The surfactants of the formulae (I), (II) and (III) may be either random copolymers or block copolymers; they are preferably block copolymers.

Furthermore, in the context of the present invention, di- and multi-block copolymers constructed from ethylene oxide and propylene oxide can be used, which are commercially available, for example, under the name Pluronic® (BASF SE) or Tetronic® (BASF Corporation). Furthermore, reaction products of sorbitan esters with ethylene oxide and/or propylene oxide can be used. Amine oxides or alkyl glycosides are also suitable. An overview of suitable non-ionic surfactants is disclosed in EP-A 851 023 and DE-A 198 19 187.

Mixtures of two or more different nonionic surfactants may also be present. The dishwashing compositions of the invention may further comprise anionic or zwitterionic surfactants, preferably in a mixture with nonionic surfactants. Suitable anionic and zwitterionic surfactants are likewise specified in EP-A 851 023 and DE-A 198 19 187.

Bleach and bleach activators (e) used in the context of the dishwashing compositions according to the invention can be representatives known to those skilled in the art. Bleaches are subdivided into oxygen bleaches and chlorine bleaches. Oxygen bleaches used are alkali metal perborates and hydrates thereof, and also alkali metal percarbonates. Preferred bleaches in this context are sodium perborate in the form of the mono- or tetrahydrate, sodium percarbonate or the hydrates of sodium percarbonate. Likewise useable as oxygen bleaches are persulfates and hydrogen peroxide. Typical oxygen bleaches are also organic peracids such as perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazelaic acid, diperoxoisophthalic acid or 2-decyldiperoxybutane-1,4-dioic acid. In addition, the following oxygen bleaches may also be used in the dishwashing composition: cationic peroxy acids, which are described in the patent applications U.S. Pat. Nos. 5,422,028, 5,294,362 and 5,292,447, and sulfonylperoxy acids, which are described in the patent application U.S. Pat. No. 5,039,447. Oxygen bleaches may be used generally in amounts of 0.1 to 30 wt %, preferably of 1 to 20 wt %, more preferably of 3 to 15 wt %, based on the overall dishwashing composition.

Chlorine bleaches and the combination of chlorine bleaches with peroxide bleaches may also be used in the context of the dishwashing compositions of the invention. Known chlorine bleaches are, for example, 1,3-dichloro-5,5-dimethylhydantoin, N-chlorosulfamide, chloramine T, dichloramine T, chloramine B, N,N'-dichlorobenzoyl urea, p-toluenesulfonedichloroamide or trichloroethylamine. Preferred chlorine bleaches in this case are sodium hypochlorite, calcium hypochlorite, potassium hypochlorite, magnesium hypochlorite, potassium dichloroisocyanurate or sodium dichloroisocyanurate. Chlorine bleaches may be used in this context in amounts of 0.1 to 30 wt %, preferably 0.1 to 20 wt %, preferably 0.2 to 10 wt %, more preferably 0.3 to 8 wt %, based on the overall dishwashing composition.

In addition, small amounts of bleach stabilizers, for example phosphonates, borates, metaborates, metasilicates or magnesium salts, may be added.

Bleach activators in the context of the present invention can be compounds which, under perhydrolysis conditions, give rise to aliphatic peroxocarboxylic acids having preferably 1 to 10 carbon atoms, in particular 2 to 4 carbon atoms, and/or substituted perbenzoic acid. In this case, suitable compounds comprise, inter alia, one or more N- or O-acyl groups and/or optionally substituted benzoyl groups, for example substances from the class of the anhydrides, esters, imides, acylated imidazoles or oximes. Examples are tetraacetylethylenediamine (TAED), tetraacetylmethylenediamine (TAMD), tetraacetylglycoluril (TAGU), tetraacetylhexylenediamine (TAHD), N-acylimides such as N-nonanoylsuccinimide (NOSI), acylated phenol sulfonates such as n-nonanoyl- or isononanoyloxybenzenesulfonate (n- or iso-NOBS), pentaacetylglucose (PAG), 1,5-diacetyl-2,2-dioxohexahydro-1,3,5-triazine (DADHT) or isatoic anhydride (ISA). Also suitable as bleach activators are nitrile quats such as N-methylmorpholinium acetonitrile salts (MMA salts) or trimethylammonium acetonitrile salts (TMAQ salts). Preferred suitable bleach activators are from the group consisting of polyacylated alkylenediamines, more preferably TAED, N-acylimides, more preferably NOSI, acylated phenolsulfonates, more preferably n- or iso-NOBS, MMA, and TMAQ. Bleach activators may be used in the context of the present invention in amounts of 0.1 to 30 wt %, preferably 0.1 to 10 wt %, preferably 1 to 9 wt %, more preferably 1.5 to 8 wt %, based on the overall dishwashing composition.

In addition to the conventional bleach activators or in place of them, so-called bleach catalysts may also be incorporated in rinse aid particles. These substances are bleach-enhancing transition metal salts or transition metal complexes such as salen complexes or carbonyl complexes of manganese, iron, cobalt, ruthenium or molybdenum. Also usable as bleach catalysts are complexes of manganese, iron, cobalt, ruthenium, molybdenum, titanium, vanadium and copper with nitrogen-containing tripod ligands and also amine complexes of cobalt, iron, copper and ruthenium.

The dishwashing compositions according to the invention may comprise 0 to 8% by weight enzymes as component (f). If the dishwashing compositions comprise enzymes, they comprise them preferably in amounts of 0.1 to 8 wt %. Enzymes may be added to the dishwashing composition in order to increase the cleaning performance or to ensure the same quality of cleaning performance under milder conditions (e.g. at low temperatures). The enzymes can be used in free form or a form chemically or physically immobilized on a support or in encapsulated form. The enzymes used most frequently in this context include lipases, amylases, cellulases and proteases. In addition, it is also possible, for example, to use esterases, pectinases, lactases and peroxidases. Preference is given in accordance with the invention to using amylases and proteases.

In the context of the dishwashing compositions according to the invention, the additives (g) used can be, for example, anionic or zwitterionic surfactants, alkali carriers, polymeric dispersants, corrosion inhibitors, defoamers, dyes, fragrances, fillers, tablet disintegrants, organic solvents, tableting aids, disintegrants, thickeners, solubilizers or water. The alkali carriers used may be, for example, in addition to the ammonium or alkali metal carbonates already mentioned as builder substances, ammonium or alkali metal hydrogencarbonates and ammonium or alkali metal sesquicarbonates, and also ammonium or alkali metal hydroxides, ammonium or alkali metal silicates and ammonium or alkali metal metasilicates and also mixtures of the aforementioned substances.

The corrosion inhibitors used may be, inter alia, silver anticorrosives from the group of the triazoles, the benzotriazoles, the bisbenzotriazoles, the aminotriazoles, the alkylaminotriazoles and the transition metal salts or complexes.

To prevent glass corrosion, which is noticeable as cloudiness, iridescence, streaks and lines on the glasses, preference is given to using glass corrosion inhibitors. Preferred glass corrosion inhibitors are, for example, magnesium, zinc and bismuth salts and complexes.

Paraffin oils and silicone oils may optionally be used in accordance with the invention as defoamers and to protect plastics and metal surfaces. Defoamers are used preferably in proportions of 0.001 wt % to 5 wt %. In addition, dyes, for example patent blue, preservatives, for example Kathon CG, perfumes and other fragrances may be added to the cleaning formulation of the invention.

In the context of the dishwashing compositions of the invention, an example of a suitable filler is sodium sulfate.

Further possible additives that should be mentioned in connection with the present invention include amphoteric and cationic polymers.

In one embodiment, the dishwashing composition of the invention is phosphate-free. The term "phosphate-free" in this context also encompasses those dishwashing compositions which comprise essentially no phosphate, i.e. comprise phosphate in technically ineffective amounts. In particular, this encompasses compositions having less than 1.0 wt %, preferably less than 0.5 wt %, of phosphate, based on the overall composition.

The present invention further comprises the use of polyaspartic acid produced or preparable according to the invention or compositions comprising this as additive in dishwashing agents, particularly in dishwashing agents for machine dishwashing (ADW).

The present invention further relates to the use of polyaspartic acids preparable according to the invention as washing power enhancers, graying inhibitors and encrustation inhibitors in detergent compositions and cleaning compositions (e.g. as additives for detergents and cleaning agents for textiles, washing aids, laundry after-treatment agents).

The present invention further relates to cleaning compositions and detergent compositions comprising polyaspartic acids preparable according to the invention. The detergent and cleaning compositions, in which the polyaspartic acids according to the invention may be used, may be in the form of powder, granules, tablets, pastes, gel or liquid. Examples thereof are heavy-duty detergents, mild-action detergents, color detergents, wool detergents, curtain detergents, modular detergents, washing tablets, bar soaps, stain removal salts, laundry starches and stiffeners, and ironing aids. They comprise at least 0.1% by weight, preferably between 0.1 and 10% by weight and particularly preferably 0.2 to 5% by weight polyaspartic acids preparable according to the invention. The compositions are to be adapted according to their intended use in terms of their composition to the type of textiles to be washed or the surfaces to be cleaned. They comprise conventional detergent and cleaning ingredients, as correspond to the prior art. Representative examples of such detergent and cleaning ingredients and compositions are described below.

The present invention further relates to detergent and cleaning compositions in liquid or gel form, comprising
($A_L$) 0.1 to 20% by weight of at least one polyaspartic acid described here and to be used according to the invention,
($B_L$) 1 to 80 wt % of surfactants,
($C_L$) 0.1 to 50 wt % of builders, cobuilders and/or complexing agents,
($D_L$) 0 to 20 wt % of bleach system,
($E_L$) 0.1 to 60 wt % of detergent or cleaning composition ingredients, i.e. other customary ingredients such as alkali carriers, defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, organic solvents, solubilizers, pH modifiers, hydrotropes, thickeners, rheology modifiers and/or alkanolamines, and
($F_L$) 0 to 98.7 wt % of water.

The sum total of ($A_L$) to ($F_L$) is 100 wt %.

The quantitative ratios of the individual components are adjusted by a person skilled in the art depending on the particular field of use of the detergent and cleaning composition in liquid and gel form.

The present invention further relates to solid detergent and cleaning compositions comprising
($A_F$) 0.1 to 20% by weight of at least one polyaspartic acid described here and to be used according to the invention,
($B_F$) 1 to 50 wt % of surfactants,
($C_F$) 0.1 to 70 wt % of builders, cobuilders and/or complexing agents,
($D_F$) 0 to 30 wt % of bleach system, and
($E_F$) 0.1 to 70 wt % of detergent or cleaning composition ingredients, i.e. other customary ingredients such as modifiers (e.g. sodium sulfate), defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, dissolution promoters, disintegrants, processing aids and/or water.

The sum total of components from ($A_F$) to ($E_F$) is 100 wt %.

The solid detergent and cleaning compositions can be present, for example, in the form of powder, granules, extrudates or tablets.

The quantitative ratios of the individual components are adjusted by a person skilled in the art depending on the particular field of use of the solid detergent and cleaning composition.

In the context of the present invention, surfactants ($B_L$ or $B_F$) used may be, for example, nonionic surfactants (NIS). The nonionic surfactants used are preferably alkoxylated, advantageously ethoxylated, in particular primary alcohols having preferably 8 to 18 carbon atoms and, on average, 1 to 12 mol of ethylene oxide (EO) per mole of alcohol, in which the alcohol radical can be linear or preferably 2-methyl-branched and/or can comprise linear and methyl-branched residues in a mixture, as customarily present in oxo alcohol residues. In particular, however, preference is given to alcohol ethoxylates with linear or branched residues from alcohols of native or petrochemical origin having 12 to 18 carbon atoms, for example from coconut alcohol, palm alcohol, tallow fatty alcohol or oleyl alcohol, and, on average, 2 to 8 EO per mole of alcohol. The preferred ethoxylated alcohols include, for example, $C_{12}$-$C_{14}$-alcohols with 3 EO, 5 EO, 7 EO or 9 EO, $C_9$-$C_{11}$-alcohol with 7 EO, $C_{13}$-$C_{15}$-alcohols with 3 EO, 5 EO, 7 EO or 9 EO, $C_{12}$-$C_{18}$-alcohols with 3 EO, 5 EO, 7 EO or 9 EO and mixtures of these, such as mixtures of $C_{12}$-$C_{14}$-alcohol with 3 EO and $C_{12}$-$C_{18}$-alcohol with 7 EO, 2 propylheptanol with 3 to 9 EO. Mixtures of short-chain alcohol ethoxylates (e.g. 2-propylheptanol×7 EO) and long-chain alcohol ethoxylates (e.g. C16,18×7 EO). The stated ethoxylation levels are statistical averages (number averages, Mn), which may be an integer or a fraction for a specific product. Preferred alcohol ethoxylates have a narrowed homolog distribution (narrow range ethoxylates, NRE). In addition to these nonionic surfactants, it is also possible to use fatty alcohols with more than 12 EO. Examples of these are tallow fatty alcohol with 14 EO, 25 EO, 30 EO or 40 EO. Also usable are nonionic surfactants comprising ethylene oxide (EO) and propylene oxide (PO) groups together in the molecule. It is possible here to use block copolymers with EO-PO block units or PO-EO block units, but also EO-PO-EO copolymers or PO-EO-PO copolymers. It is of course also possible to use mixedly alkoxylated nonionic surfactants in which EO and PO units are not in blocks but in random distribution. Such products are obtainable by the simultaneous action of ethylene oxide and propylene oxide on fatty alcohols.

In addition, as further nonionic surfactants, in accordance with the invention, it is also possible to use alkyl glycosides of the general formula (V)

in which $R^{10}$ is a primary straight-chain or methyl-branched, in particular 2-methyl-branched, aliphatic radical having 8 to 22, preferably 12 to 18 carbon atoms, and G is a glycoside unit having 5 or 6 carbon atoms, preferably glucose. The degree of oligomerization i, which indicates the distribution of monoglycosides and oligoglycosides, is any desired number between 1 and 10; preferably i is 1.2 to 1.4.

In the context of the present invention, a further class of nonionic surfactants used with preference, which are used either as the sole nonionic surfactant or in combination with other nonionic surfactants, is that of alkoxylated, preferably ethoxylated or ethoxylated and propoxylated fatty acid alkyl esters, preferably having 1 to 4 carbon atoms in the alkyl chain, in particular fatty acid methyl esters, as described, for example, in the Japanese patent application JP 58/217598 or which are preferably prepared by the process described in the international patent application WO 90/13533. Nonionic surfactants of the amine oxide type, for example N-cocoalkyl-N,N-dimethylamine oxide and N-tallow-alkyl-N,N-dihydroxyethylamine oxide, and the fatty acid alkanolamides may also be suitable in this context. The amount (weight) of these nonionic surfactants is preferably not more than that of the ethoxylated fatty alcohols, especially not more than half thereof.

Further suitable surfactants ($B_L$ or $B_F$) are, in accordance with the invention, polyhydroxy fatty acid amides of the formula (VI)

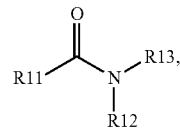

in which R11C(=O) is an aliphatic acyl radical having 6 to 22 carbon atoms, R12 is hydrogen, an alkyl or hydroxyalkyl radical having 1 to 4 carbon atoms and R13 is a linear or branched polyhydroxyalkyl radical having 3 to 10 carbon atoms and 3 to 10 hydroxyl groups. The polyhydroxy fatty acid amides are known substances which can typically be obtained by reductive amination of a reducing sugar with ammonia, an alkylamine or an alkanolamine and subsequent acylation with a fatty acid, a fatty acid alkyl ester or a fatty acid chloride. The group of the polyhydroxy fatty acid amides also includes compounds of the formula (VII) in this context

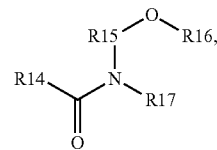

in which R14 is a linear or branched alkyl or alkenyl radical having 7 to 12 carbon atoms, R15 is a linear, branched or cyclic alkylene radical having 2 to 8 carbon atoms or an arylene radical having 6 to 8 carbon atoms and R16 is a linear, branched or cyclic alkyl radical or an aryl radical or an oxyalkyl radical having 1 to 8 carbon atoms, where $C_1$-$C_4$-alkyl or phenyl residues are preferred, and R17 is a linear polyhydroxyalkyl radical whose alkyl chain is substituted with at least two hydroxyl groups, or alkoxylated, preferably ethoxylated or propoxylated, derivatives of this radical. R17 is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amides, for example according to WO 95/07331 by reaction with fatty acid methyl esters in the presence of an alkoxide as catalyst.

Surfactants ($B_L$ or $B_F$) may, in accordance with the invention, also be anionic surfactants. In the context of the present invention, the anionic surfactants used may be those of the sulfonate and sulfate type, for example. Suitable surfactants of the sulfonate type here are preferably $C_9$-$C_{13}$-alkylbenzenesulfonates, olefinsulfonates, i.e. mixtures of alkene- and hydroxyalkanesulfonates, and also disulfonates, as obtained, for example, from $C_{12}$-$C_{18}$-monoolefins with terminal or internal double bond by sulfonation with gaseous sulfur trioxide and subsequent alkaline or acidic hydrolysis of the sulfonation products. Also suitable are alkanesulfonates which are obtained from $C_{12}$-$C_{18}$-alkanes, for example, by sulfochlorination or sulfoxidation with subsequent hydrolysis and/or neutralization. Likewise, the esters of α-sulfo fatty acids (ester sulfonates), for example the α-sulfonated methyl esters of hydrogenated coconut, palm kernel or tallow fatty acids, are also suitable. Further suitable anionic surfactants may, in accordance with the invention, be sulfated fatty acid glycerol esters. Fatty acid glycerol esters are understood to mean, inter alia, the mono-, diand triesters, and mixtures thereof, as obtained in the preparation by esterification of a monoglycerol with 1 to 3 mol of fatty acid or in the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

The alk(en)yl sulfates here are preferably the alkali metal and in particular the sodium salts of the sulfuric acid half-esters of $C_{12}$-$C_{18}$-fatty alcohols, for example of coconut fatty alcohol, tallow fatty alcohol, lauryl alcohol, myristyl alcohol, cetyl alcohol or stearyl alcohol or of the $C_{10}$-$C_{20}$-oxo alcohols and those half-esters of secondary alcohols of these chain lengths. Furthermore, preference is given to alk(en)yl sulfates of the specified chain length which comprise a synthetic, straight-chain alkyl radical which has been prepared on a petrochemical basis, which have analogous degradation behavior to the appropriate compounds based on oleochemical raw materials. From the point of view of washing, preference is given to the $C_{12}$-$C_{16}$-alkyl sulfates and $C_{12}$-$C_{15}$-alkyl sulfates, and also $C_{14}$-$C_{15}$-alkyl sulfates. 2,3-Alkyl sulfates, which are prepared for example in accordance with the U.S. Pat. No. 3,234,258 or 5,075,041 and can be obtained as commercial products of the Shell Oil Company under the name DAN®, are also suitable anionic surfactants. Also suitable are the sulfuric acid monoesters of the straight-chain or branched $C_7$-$C_{21}$-alcohols ethoxylated with 1 to 6 mol of ethylene oxide, such as 2-methyl-branched $C_9$-$C_{11}$-alcohols with on average 3.5 mol of ethylene oxide (EO) or $C_{12}$-$C_{18}$-fatty alcohols with 1 to 4 EO, inter alia. On account of their high foaming propensity, they are typically used in cleaning compositions only in relatively small amounts, for example in amounts of 1 to 5 wt %. Further suitable anionic surfactants in the context of the present invention are also the salts of alkylsulfosuccinic acid, which are also referred to as sulfosuccinates or as sulfosuccinic acid esters and are the monoesters and/or diesters of sulfosuccinic acid with alcohols, preferably fatty alcohols and especially ethoxylated fatty alcohols. Preferred sulfosuccinates comprise $C_8$-$C_{18}$ fatty alcohol radicals or mixtures of these. Particularly preferred sulfosuccinates comprise a fatty alcohol radical derived from ethoxylated fatty alcohols. In this connection, particular preference is in turn given to sulfosuccinates whose fatty alcohol residues are derived from ethoxylated fatty alcohols with a narrow homolog distribution. It is likewise also possible to use alk(en)ylsuccinic acid having preferably 8 to 18 carbon atoms in the alk(en)yl chain or salts thereof.

Particularly preferred anionic surfactants are soaps. Saturated and unsaturated fatty acid soaps are suitable, such as the salts of lauric acid, myristic acid, palmitic acid, stearic acid, (hydrogenated) erucic acid and behenic acid, and especially soap mixtures derived from natural fatty acids, for example coconut fatty acids, palm kernel fatty acids, olive oil fatty acids or tallow fatty acids.

The anionic surfactants including the soaps can be present in accordance with the invention in the form of their sodium, potassium or ammonium salts, and also as soluble salts of organic bases, such as mono-, di- or triethanolamine. The anionic surfactants are preferably in the form of their sodium or potassium salts, especially in the form of the sodium salts.

In the context of the present invention, the surfactants ($B_L$ or $B_F$) used may also be cationic surfactants. Particularly suitable cationic surfactants that may be mentioned here, for example, are:

$C_7$-$C_{25}$-alkylamines;

N,N-dimethyl-N-(hydroxy-$C_7$-$C_{25}$-alkyl)ammonium salts;

mono- and di($C_7$-$C_{25}$-alkyl)dimethylammonium compounds quaternized with alkylating agents;

ester quats, especially quaternary esterified mono-, di- and trialkanolamines esterified with $C_8$-$C_{22}$-carboxylic acids;

imidazoline quats, in particular 1-alkylimidazolinium salts of formulae VIII or IX

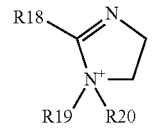

(VIII)

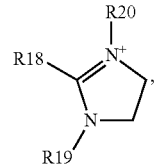

(IX)

where the variables are defined as follows:
R18 $C_1$-$C_{25}$-alkyl or $C_2$-$C_{25}$-alkenyl;
R19 $C_1$-$C_4$-alkyl or hydroxy-$C_1$-$C_4$-alkyl;
R20 $C_1$-$C_4$-alkyl, hydroxy-$C_1$-$C_4$-alkyl or a $R_1$—(CO)—$R^{21}$—(CH$_2$)$_j$—($R^{21}$:—O— or —NH—; j: 2 or 3) radical, where at least one R18 radical is a $C_7$-$C_{22}$-alkyl.

In the context of the present invention, the surfactants ($B_L$ or $B_F$) may also be amphoteric surfactants. Suitable amphoteric surfactants here are, e.g. alkyl betaines, alkylamide betaines, aminopropionates, aminoglycinates and amphoteric imidazolium compounds.

The content of surfactants in detergent and cleaning compositions of the invention in liquid and gel form is preferably 2 to 75 wt % and in particular 5 to 65 wt %, based in each case on the overall composition.

The content of surfactants in solid detergent and cleaning compositions of the invention is preferably 2 to 40 wt % and in particular 5 to 35 wt %, based in each case on the overall composition.

In the context of the present invention, suitable as builders, co-builders and/or complexing agents ($C_L$ or $C_F$), inter alia, are inorganic builders such as:

crystalline and amorphous aluminosilicates with ion-exchanging properties, such as in particular zeolites: various types of zeolites are suitable, in particular the zeolites A, X, B, P, MAP and HS in their Na form or in forms in which Na is partially exchanged for other cations such as Li, K, Ca, Mg or ammonium;

crystalline silicates, such as in particular disilicates and sheet silicates, e.g. δ- and β-Na$_2$Si$_2$O$_5$. The silicates can be used in the form of their alkali metal, alkaline earth metal or ammonium salts, preference being given to the Na, Li and Mg silicates;

amorphous silicates, such as sodium metasilicate and amorphous disilicate;

carbonates and hydrogen carbonates: These can be used in the form of their alkali metal, alkaline earth metal or ammonium salts. Preference is given to Na, Li and Mg carbonates and hydrogen carbonates, in particular sodium carbonate and/or sodium hydrogen carbonate; and polyphosphates, such as pentasodium triphosphate.

In the context of the present invention, suitable cobuilders and complexing agents ($C_L$ or $C_F$) include:

low molecular weight carboxylic acids such as citric acid, hydrophobically modified citric acid, e.g. agaric acid, malic acid, tartaric acid, gluconic acid, glutaric acid, succinic acid, imidodisuccinic acid, oxydisuccinic acid, propanetricarboxylic acid, butanetetracarboxylic acid, cyclopentanetetracarboxylic acid, alkyl- and alkenyl-succinic acids and aminopolycarboxylic acids, e.g. nitrilotriacetic acid, β-alaninediacetic acid, ethylenediaminetetraacetic acid, serinediacetic acid, isoserinediacetic acid, N-(2-hydroxyethyl)iminoacetic acid, ethylenediaminedisuccinic acid, glutamic acid diacetic acid and methyl- and ethylglycinediacetic acid or alkali metal salts thereof; Particularly preferred complexing agents are methylglycinediacetic acid and salts thereof, especially the mono-, di- and trisodium, -potassium, -lithium and -ammonium salts thereof. The salts of methylglycinediacetic acid may be in racemic form, meaning that D- and L-enantiomers are present in an equimolar mixture, or one enantiomer, e.g. the L-enantiomer, may be present in excess.

oligomeric and polymeric carboxylic acids, such as homopolymers of acrylic acid, copolymers of acrylic acid with sulfonic acid group-containing comonomers such as 2-acrylamido-2-methylpropanesulfonic acid (AMPS), allylsulfonic acid and vinylsulfonic acid, oligomaleic acids, copolymers of maleic acid with acrylic acid, methacrylic acid or $C_2$-$C_{22}$-olefins, e.g. isobutene or long chain α-olefins, vinyl-$C_1$-$C_8$-alkyl ethers, vinyl acetate, vinyl propionate, (meth)acrylic esters of $C_1$-$C_8$-alcohols and styrene. Preference is given to the homopolymers of acrylic acid and copolymers of acrylic acid with maleic acid or AMPS. The oligomeric and polymeric carboxylic acids are used in acid form or as the sodium salt;

phosphonic acids such as 1-hydroxyethylene(1,1-diphosphonic acid), aminotri(methylenephosphonic acid), ethylenediaminetetra(methylenephosphonic acid) and diethylenetriaminepenta(methylenephosphonic acid) and alkali metal salts thereof.

Suitable bleaches ($D_L$ or $D_F$) in accordance with the invention include: sodium perborate tetrahydrate, sodium perborate monohydrate, sodium percarbonate, peroxypyrophosphates, citrate perhydrates and also peracid salts or peracids such as perbenzoates, peroxophthalates, diperazelaic acid, phthaloimino peracid or diperdodecanedioic acid. In order to wash at temperatures of 60° C. and to achieve an improved bleach effect thereby, bleach activators may, in accordance with the invention, be incorporated into the detergent or cleaning compositions. Bleach activators used can be, for example, compounds which, under perhydrolysis conditions, give rise to aliphatic peroxocarboxylic acids having preferably 1 to 10 carbon atoms, in particular 2 to 4 carbon atoms, and/or optionally substituted perbenzoic acid. Suitable are substances, inter alia, which bear O-acyl and/or N-acyl groups of the carbon atom number specified and/or optionally substituted benzoyl groups. In accordance with the invention, polyacylated alkylenediamines are preferred, in particular tetraacetylethylenediamine (TAED), acylated triazine derivatives, particularly 1,5-diacetyl-2,4-dioxohexahydro-1,3,5-triazine (DADHT), acylated glycolurils, in particular tetraacetylglycoluril (TAGU)1 N-acylimides, particularly N-nonanoylsuccinimide (NOSI), acylated phenolsulfonates, particularly n-nonanoyl- or isononanoyloxybenzenesulfonate (n- or iso-NOBS), carboxylic anhydrides, particularly phthalic anhydride, acylated polyhydric alcohols, in particular triacetin, ethylene glycol diacetate and 2,5-diacetoxy-2,5-dihydrofuran. In addition to the conventional bleach activators or in their place, what are called bleach catalysts may also be incorporated in accordance with the invention into the liquid detergent or cleaning compositions as constituents ($D_L$). These substances are bleach-enhancing transition metal salts or transition metal complexes such as for example salen complexes or carbonyl complexes of Mn, Fe, Co, Ru or Mo. Also usable as bleach catalysts are complexes of Mn, Fe, Co, Ru, Mo, Ti, V and Cu with nitrogen-containing tripod ligands and also amine complexes of Co, Fe, Cu and Ru.

Customary ingredients for cleaning or detergent compositions ($E_L$ or $E_F$) are known to those skilled in the art and comprise, for example, alkali carriers, defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, organic solvents, solubilizers, pH modifiers, hydrotropes, thickeners, rheology modifiers and/or alkanolamines for liquid or gel-type cleaning or detergent compositions ($E_L$), or modifiers (e.g. sodium sulfate), defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, dissolution promoters, disintegrants, processing aids and/or water for solid cleaning or detergent compositions ($E_F$).

Suitable enzymes ($E_L$ or $E_F$) in accordance with the invention are in particular those from the classes of the hydrolases, such as the proteases, esterases, lipases or lipolytic enzymes, amylases, cellulases and other glycosyl hydrolases and mixtures of said enzymes. All of these hydrolases contribute during washing to the removal of stains such as protein-, fat- or starch-containing stains and graying. Cellulases and other glycosyl hydrolases can moreover contribute to the color retention and to increasing the softness of the textile by removing pilling and microfibrils. Oxyreductases can also be used for the bleaching or for the inhibition of color transfer. Of particularly good suitability are active enzymatic compounds obtained from bacterial strains or fungi such as *Bacillus subtilis, Bacillus licheniformis, Streptomyceus griseus* and *Humicola insolens*. Preference is given to using proteases of the subtilisin type and in particular proteases which are obtained from *Bacillus lentus*. Here, enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but in particular protease and/or lipase-containing mixtures or mixtures with lipolytic enzymes are of particular interest. Examples of such lipolytic enzymes are known cutinases. Peroxidases or oxidases may also be used in this case. The suitable amylases include especially α-amylases, isoamylases, pullulanases and pectinases. Cellulases used are preferably cellobiohydrolases, endoglucanases and β-glucosidases, which are also called cellobiases, or mixtures of these. Since different cellulase types differ by their CMCase and avicelase activities, it is possible to establish the desired activities by means of selected mixtures of the cellulases.

The enzymes may, in accordance with the invention, be adsorbed on carrier substances in order to protect them from premature breakdown. The proportion of the enzymes, enzyme mixtures or enzyme granules may be, in accordance with the invention, for example, about 0.1 to 5 wt %, preferably 0.12 to about 2.5 wt %, based in each case on the total formulation.

Suitable graying inhibitors ($E_L$ or $E_F$) are, for example, carboxymethylcellulose, graft polymers of vinyl acetate on polyethylene glycol, and alkoxylates of polyethyleneimine.

As thickeners ($E_L$), so-called associative thickeners may be used. Suitable examples of thickeners are known to those skilled in the art and are described, inter alia, in WO 2009/019225 A2, EP 013 836 or WO 2006/016035.

In the context of the present invention, optical brighteners (called "whiteners") ($E_L$ or $E_F$) can be added to the liquid detergent or cleaning compositions in order to eliminate graying and yellowing of the treated textile fabrics. These substances attach to the fibers and bring about a brightening and simulated bleaching effect by converting invisible ultraviolet radiation to visible longer-wave light, with emission of the ultraviolet light absorbed from the sunlight as pale bluish fluorescence to give pure white with the yellow shade of grayed and/or yellowed laundry. Suitable compounds originate, for example, from the substance classes of the 4,4'-diamino-2,2'-stilbenedisulfonic acids (flavonic acids), 4,4'-distyrylbiphenylene, methylumbelliferones, coumarins, dihydroquinolinones, 1,3-diarylpyrazolines, naphthalimides, benzoxazole, benzisoxazole and benzimidazole systems, and the pyrene derivatives substituted by heterocycles. The optical brighteners are typically used in amounts between 0.03 and 0.3 wt %, based on the finished composition.

Suitable dye transfer inhibitors ($E_L$ or $E_F$) are, in accordance with the invention, for example, homopolymers, copolymers and graft polymers of 1-vinylpyrrolidone, 1-vinylimidazole or 4-vinylpyridine N-oxide. Homopolymers and copolymers of 4-vinylpyridine reacted with chloroacetic acid are also suitable as dye transfer inhibitors.

Detergent ingredients are otherwise generally known. Detailed descriptions can be found, for example, in WO 99/06524 and WO 99/04313; in Liquid Detergents, Editor: Kuo-Yann Lai, Surfactant Sci. Ser., Vol. 67, Marcel Decker, New York, 1997, pp. 272-304. Further detailed descriptions of detergent and cleaning agent ingredients are found, for example, in: Handbook of Detergents, Part D: Formulation, Surfactant Sci Ser, Vol. 128, Editor: Michael S. Showell, CRC Press 2006; Liquid Detergents sec. Edition, Surfactant Sci Ser, Vol. 129, Editor: Kuo-Yann Lai, CRC Press 2006; or Waschmittel: Chemie, Umwelt, Nachhaltigkeit, (Detergents: chemistry, environment, sustainability), Gunter Wagner, Wiley-VCH Verlag GmbH & Co. KGaA, August 2010.

As has been found in the context of the present invention, the polyaspartic acid produced or preparable in accordance with the method according to the invention described here is very well-suited as calcium carbonate scale inhibitor. The present invention therefore further comprises the use of polyaspartic acids produced or preparable according to the invention or compositions comprising these as scale inhibitors, preferably as calcium carbonate scale inhibitors.

The invention further relates to the use of polyaspartic acids of the invention or mixtures thereof as scale inhibitors or dispersants in water-conducting systems. Water-conducting systems in which polyaspartic acids preparable by the method of the invention can be used are in principle all systems which come into contact permanently or periodically with water such as seawater, brackish water, river water, urban or industrial wastewater or industrial process water such as cooling water, and in which scale formation can occur.

Water-conducting systems in which the polymers of the invention can be used are, in particular, seawater desalination plants, brackish water desalination plants, cooling water systems and boiler feed water systems, boilers, heaters, continuous-flow heaters, hot water tanks, cooling towers, cooling water circuits and other industrial process water. The desalination plants may be thermal in nature or based on membrane processes such as reverse osmosis or electrodialysis.

In general, the polymers of the invention are added to the water-conducting systems in amounts of 0.1 mg/l to 100 mg/l. The optimal dosage is determined by the requirements of the respective application or according to the operating conditions of the relevant process. For instance, in thermal seawater desalination, the polymers are preferably used at concentrations of 0.5 mg/l to 10 mg/l. Polymer concentrations of up to 100 mg/l are used in industrial cooling circuits or boiler feed water systems. Water analyses are often carried out in order to determine the proportion of scale-forming salts and thus the optimal dosage.

Formulations may also be added to the water-conducting systems which may comprise, in addition to the polymers of the invention and depending on requirements, inter alia, phosphonates, polyphosphates, zinc salts, molybdate salts, organic corrosion inhibitors such as benzotriazole, tolyltriazole, benzimidazole or ethynyl carbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP) diethylenetriaminepenta(methylenephosphonic acid) (DTPMP) and ethylenediaminetetra(methylenephosphonic acid) (EDTMP), which are used in each case in acid form or in the form of sodium salts thereof.

The following examples serve to illustrate the present invention and must not be understood as a restriction thereon.

EXAMPLES

Comparative Example 1: Polycondensation of L-aspartic Acid in the Presence of 5 mol % Methanesulfonic Acid in a Glass Reactor 133.1 g of L-aspartic acid, 30 g of water and 4.81 g of methanesulfonic acid (100%) were initially charged in a 2 l capacity glass reactor equipped with stirrer and temperature sensor. The reaction mixture was heated to the condensation temperature of 210° C. to 220° C. with stirring under a gentle stream of nitrogen with simultaneous removal of water by distillation. After 15 minutes, a highly viscous paste formed which could no longer be stirred. Within a further 15 minutes, the reaction product had solidified to a solid mass. The reactor was cooled to room temperature. The caked reaction mixture was removed from the reactor with a spatula and comminuted to a powder using a pestle and mortar. The comminuted reaction mixture was again placed in the reactor, heated to the condensation temperature of 210° C. to 220° C. with stirring under a gentle stream of nitrogen and polycondensed at this temperature for a further 5.5 hours with simultaneous removal of water by distillation. In order to prepare the aqueous sodium salt solution of the polyaspartic acid, 100 g of the cooled reaction product were dispersed in 100 g of water, the mixture was heated to 70°

C. and sufficient 50% aqueous sodium hydroxide solution was added at this temperature that the pH was in the range of 7 to 9. The powder dispersed in water dissolved gradually and a clear aqueous sodium salt solution of polyaspartic acid was obtained. The weight-average molecular weight Mw was 7700 g/mol.

Comparative Example 2: Polycondensation of L-aspartic Acid in the Presence of 5 mol % Methanesulfonic acid in a 0.7 L LIST Discotherm B Reactor 266.2 g of L-aspartic acid, 60 g of water and 9.62 g of methanesulfonic acid were initially charged in a 0.7 l LIST Discotherm B reactor. The reactor contents were heated to the condensation temperature of 230° C. with stirring at 20 revolutions per minute under a gentle stream of nitrogen with simultaneous removal of water by distillation. After 15 minutes a highly viscous, sticky paste was formed and a high torque increase was observed. After a further 15 minutes, the reaction product solidified to a solid mass and the stirrer shaft finally came to a standstill. After cooling to room temperature, the caked reaction mixture was removed from the reactor with the aid of a spatula and comminuted to a powder using a pestle and mortar. The comminuted reaction mixture was again placed in the reactor, heated to the condensation temperature of 230° C. with stirring under a gentle stream of nitrogen and polycondensed at this temperature for a further 5.5 hours with simultaneous removal of water by distillation. Hydrolysis of the resulting end product to give the aqueous sodium salt solution of polyaspartic acid was carried out as described in C1. The weight-average molecular weight Mw was 7700 g/mol.

Example 1: Heating L-aspartic Acid in the Presence of 5 mol % Methanesulfonic Acid in a Glass Reactor Under Reflux Cooling 266.2 g of L-aspartic acid, 10 g of water and 13.7 g of methanesulfonic acid (70% in water) were initially charged in a 2 l capacity glass reactor equipped with stirrer and temperature sensor. The reactor contents were stirred at 20 revolutions per minute at a temperature of 170 to 180° C. under reflux cooling. A sample was taken in each case after 30 min, 90 min, 120 and 180 min and the degree of conversion of L-aspartic acid was determined (measurement as described below):

The degree of conversion of L-aspartic acid after 30 min was 2.0%.

The degree of conversion of L-aspartic acid after 90 min was 5.2%.

The degree of conversion of L-aspartic acid after 120 min was 9.5%.

The degree of conversion of L-aspartic acid after 180 min was 8.5%.

Example A: Polycondensation of L-aspartic Acid Under Reflux Cooling in the Presence of 5 mol % Methanesulfonic Acid in a 0.7 l LIST Discotherm B Reactor 266.2 g of L-aspartic acid, 10 g of water and 13.7 g of methanesulfonic acid (70% in water) were initially charged in a 0.7 l LIST Discotherm B reactor. The reactor contents were heated under reflux cooling at a temperature of 170 to 180° C. for 2 h while stirring at 20 revolutions per minute. The degree of conversion of L-aspartic acid after this step was 9.5% (measured as described below). The reaction mixture was then heated to the condensation temperature of 210° C. to 220° C. with stirring under a gentle stream of nitrogen and polycondensed at this temperature for 5 h with simultaneous removal of water by distillation. Caking of the reaction mixture and thus standstill of the apparatus did not occur. Manual comminution with the aid of a spatula or mortar was not required. Hydrolysis of the resulting end product to give the aqueous sodium salt solution of polyaspartic acid was carried out as described in C1. The weight-average molecular weight Mw was 7680 g/mol.

Example B: Polycondensation of L-aspartic Acid Under Reflux Cooling in the Presence of 5 mol % Methanesulfonic Acid in a 0.7 L LIST Discotherm B Reactor 266.2 g of L-aspartic acid, 20 g of water and 13.7 g of methanesulfonic acid (70% in water) were initially charged in a 0.7 l LIST Discotherm B reactor. The reactor contents were heated under reflux cooling at a temperature of 170 to 180° C. for 1 h while stirring at 20 revolutions per minute. The degree of conversion of L-aspartic acid after this step was 2.0% (measured as described below). The reaction mixture was then heated to the condensation temperature of 210° C. to 220° C. with stirring under a gentle stream of nitrogen and polycondensed at this temperature for 5 h with simultaneous removal of water by distillation. Caking of the reaction mixture and thus standstill of the apparatus did not occur. Manual comminution with the aid of a spatula or mortar was not required. Hydrolysis of the resulting end product to give the aqueous sodium salt solution of polyaspartic acid was carried out as described in C1. The weight-average molecular weight Mw was 7530 g/mol.

Example C: Polycondensation of L-aspartic Acid Under Reflux Cooling in the Presence of 8 mol % Phosphoric Acid in a Glass Reactor 266.2 g of L-aspartic acid, 10 g of water and 18.5 g of phosphoric acid (85% in water) were initially charged in a 2 l capacity glass reactor equipped with stirrer and temperature sensor. The reactor contents were heated under reflux cooling at a temperature of 170 to 180° C. for 2 h while stirring at 20 revolutions per minute. The degree of conversion of L-aspartic acid after this step was 3.7% (measured as described below). The reaction mixture was then heated to the condensation temperature of 210° C. to 220° C. with stirring under a gentle stream of nitrogen and polycondensed at this temperature for 4.5 h with simultaneous removal of water by distillation. Caking of the reaction mixture and thus standstill of the apparatus did not occur. Manual comminution with the aid of a spatula or mortar was not required. Hydrolysis of the resulting end product to give the aqueous sodium salt solution of polyaspartic acid was carried out as described in C1. The weight-average molecular weight Mw was 9780 g/mol.

Example D: Polycondensation of L-aspartic Acid Under Reflux Cooling in the Presence of 5 mol % Methanesulfonic Acid in a Glass Reactor 266.2 g of L-aspartic acid and 9.61 g of methanesulfonic acid (100%) were initially charged in a 2 l capacity glass reactor equipped with stirrer and temperature sensor. The reactor contents were heated under reflux cooling at a temperature of 170 to 180° C. for 1.5 h while stirring at 20 revolutions per minute. The degree of conversion of L-aspartic acid after this step was 5.2% (measured as described below). The reaction mixture was then heated to the condensation temperature of 210° C. to 220° C. with stirring under a gentle stream of nitrogen and polycondensed at this temperature for 6 h with simultaneous removal of water by distillation. Caking of the reaction mixture and thus standstill of the apparatus did not occur. Manual comminution with the aid of a spatula or mortar was not required. Hydrolysis of the resulting end product to give the aqueous sodium salt solution of polyaspartic acid was carried out as described in C1. The weight-average molecular weight Mw was 8300 g/mol.

Determination of the Molecular Weight (Mw and Mn)

The weight-average or number-average molecular weight (Mw and Mn) of the examples was determined by GPC (gel permeation chromatography) under the following conditions:

| Column | PSS SUPREMA analytical linear M (material: polyhydroxymethacrylate copolymer network Length: 300 mm, diameter 8 mm, particle size 10μ) |
|---|---|
| Eluent | 0.08 mol/L TRIS buffer pH 7.0 in dist. water + 0.15 mol/L NaCl + 0.01 mol/L NaN$_3$. |
| Column temperature | 35° C. |
| Flow rate | 0.8 mL/min |
| Injection | 100 μL |
| Concentration | 1.5 mg/mL |
| Detector | DRI Agilent 1100 UV GAT-LCD 503 (260 nm) |

To determine the molecular weight, a small amount of the polyaspartimide formed after the polycondensation step was taken and washed repeatedly with water in order to remove the methanesulfonic acid used. The washed powder was then hydrolyzed as described with aqueous sodium hydroxide solution (i.e. the washed powder was dispersed in water, the mixture was heated to 70° C. and sufficient 50% aqueous sodium hydroxide solution was added at this temperature so that the pH was in the range of 7-9. The powder dispersed in water dissolved gradually and a clear aqueous sodium salt solution of polyaspartic acid was obtained). Sample solutions were filtered through Sartorius Minisart RC 25 (0.2 μm). Calibration was performed using narrowly distributed Na-PAA standards from Polymer Standard Service with molecular weights of M=1250 g/mol to M=130 500 g/mol. In addition, Na-acrylate having a molecular weight of M=96 and a PEG standard with M=620, which is synonymous with Na-PAA M=150, was used. The values outside of this elution range were extrapolated. The evaluation limit was 122 g/mol.

Determination of the Degree of Conversion:

To determine the degree of conversion C, the proportion of unreacted monomeric aspartic acid in the reaction mixture after step (b) was determined. For this purpose, 100 mg of the precondensate obtained after step (b) were weighed into a 50 ml glass ampoule, 9.9 mL of 1N HCl were added and the mixture was stirred at 350 rpm for 3 hours. The sample was then filtered through a Spartan 30 mm/0.45 μm RC syringe filter (GE Healthcare) and diluted 1:10 (v/v) with water. The aspartic acid content Y of this diluted solution was determined by high-performance liquid chromatography (HPLC) according to $$C=(X-Y)/X$$

where X is the aspartic acid content in 100 mg of the reaction mixture prior to the start of step (b).

Exemplary Example 1

Prior to commencement of step (b), 100 mg of the reaction mixture contained 91.8 mg (=X) of aspartic acid.

After heating for 30 minutes under reflux, an aspartic acid content of 90 mg (=Y) per 100 mg of reaction mixture was determined. Thus, the degree of conversion C was $$C=(91.8\text{ mg}-90\text{ mg})/91.8\text{ mg}=2.0\%$$

After heating for 90 minutes under reflux, an aspartic acid content of 87 mg (=Y) per 100 mg of reaction mixture was determined. Thus, the degree of conversion was $$C=(91.8\text{ mg}-87\text{ mg})/91.8\text{ mg}=5.2\%$$

After heating for 120 minutes under reflux, an aspartic acid content of 83 mg (=Y) per 100 mg of reaction mixture was determined. Thus, the degree of conversion C was $$C=(91.8\text{ mg}-83\text{ mg})/91.8\text{ mg}=9.5\%$$

After heating for 180 minutes under reflux, an aspartic acid content of 84 mg (=Y) per 100 mg of reaction mixture was determined. Thus, the degree of conversion C was $$C=(91.8\text{ mg}-84\text{ mg})/91.8\text{ mg}=8.5\%$$

| Apparatus | Agilent 1290 Infinity Series with diode array detector |
|---|---|
| Separating column: | SIELC Primesep 100, 5 μm 100 A (3.2 × 100 mm) |
| Temperature | 25° C. |
| Injection volume: | 5 μL |
| Flow rate | 1.0 mL/min |
| Detection | 205 nm |
| Eluent | Eluent A: water/acetonitrile 7/3 v/v |
| | Eluent B: water/acetonitrile/phosphoric acid 700/300/5 v/v/v |

| Gradient: | | | | |
|---|---|---|---|---|
| Run time (min) | 0 | 5 | 6 | 15 |
| Eluent A (vol %) | 95 | 87.5 | 100 | 100 |
| Eluent B (vol %) | 5 | 12.5 | 0 | 0 |

| Calibration | Two weighings of the aspartic acid reference substance (Merck Millipore) were dissolved in 2 mL of 1M HCl and made up with water. The two stock solutions were further diluted to form 4 further calibration solutions. The concentrations of the 6 calibration solutions prepared were selected so that the content of the sample is within the range of the calibration solutions. |
|---|---|

The invention claimed is:

1. A method for producing polyaspartic acid, the method comprising:
   (a) contacting a mixture of:
      (i) aspartic acid, and
      (ii) 1 to 25 mol % of an acidic catalyst;
   in a reactor;
   (b) heating the mixture according to (a) under reflux cooling without distillative removal of water at a reaction temperature of 100 to 220° C. up to a degree of conversion of the aspartic acid of at least 1%;
   (c) polycondensing the reaction mixture according to (b) with simultaneous distillative removal of water at 170 to 250° C. to produce polycondensates; and
   (d) hydrolyzing the polycondensates according to (c) with addition of a base.

2. The method according to claim 1, wherein contacting the mixture according to (a) comprises adding 3 to 15 mol % of the acidic catalyst.

3. The method according to claim 1, wherein the acidic catalyst is methanesulfonic acid.

4. The method according to claim 1, wherein the polycondensing (c) is carried out at 200 to 250° C.

5. The method according to claim 1, wherein the base is selected from the group consisting of aqueous sodium hydroxide solution, aqueous potassium hydroxide solution, calcium hydroxide, barium hydroxide, sodium carbonate, potassium carbonate, ammonia, and ammonium hydroxide.

6. The method according to claim 1, wherein the degree of conversion of the aspartic acid during the heating (b) is at least 5%.

7. The method according to claim 1, wherein the temperature of the heating (b) is 160 to 180° C.

8. The method according to claim 1, wherein the contacting (a) further comprises adding water to the mixture.

9. The method according to claim 1 further comprising:
   (e) acidifying salts of polyaspartic acid obtained by the hydrolyzing (d).

10. The method according to claim 9, wherein the acidifying (e) is carried out with a mineral acid or an acidic ion exchanger.

* * * * *